United States Patent [19]

Baumgartner

[11] 4,366,525
[45] Dec. 28, 1982

[54] AIR IONIZER FOR ROOMS

[75] Inventor: Carl Baumgartner, Hombrechtikon, Switzerland

[73] Assignee: Elcar Zürich AG, Rapperswil, Switzerland

[21] Appl. No.: 240,399

[22] Filed: Mar. 4, 1981

[30] Foreign Application Priority Data

Mar. 13, 1980 [CH] Switzerland ............... 1967/80

[51] Int. Cl.³ ................ B03C 3/40; H01G 3/00
[52] U.S. Cl. ............... 361/231; 55/151; 55/126; 55/410; 98/40 N; 98/40 A; 422/121
[58] Field of Search ............ 55/6, 124, 126, 128, 55/129, 133, 140, 141, 143, 145, 148, 150, 151, 152, 410; 422/121, 22; 361/230–231; 98/40 N, 40 A; 239/587

[56] References Cited

U.S. PATENT DOCUMENTS 2,528,130 10/1950 Frisk et al. ............... 98/40 A
3,626,669 12/1971 Cardiff ................... 55/126
3,804,942 4/1974 Kato et al. ................ 55/126
3,846,072 11/1974 Patterson ................ 422/121
4,133,652 1/1979 Ishikawa et al. .......... 55/279
4,244,712 1/1981 Tongret ................... 55/124

Primary Examiner—Bernard Nozick
Attorney, Agent, or Firm—Watson, Cole, Grindle & Watson

[57] ABSTRACT

A room air ionizer which includes a housing having an air inlet and an air outlet, a fan for drawing air into the housing through the air inlet and for blowing air out of the housing through the air outlet, negative ion-producing electrodes located between the fan and the air outlet and a high-voltage generator electrically connected to the electrodes, the improvement wherein a mounting plate which includes a plurality of adjustable ball nozzles is positioned over the air outlet, each of the ball nozzles being individually rotatable to determine in what direction the air with negative ions passing therethrough will flow.

7 Claims, 4 Drawing Figures

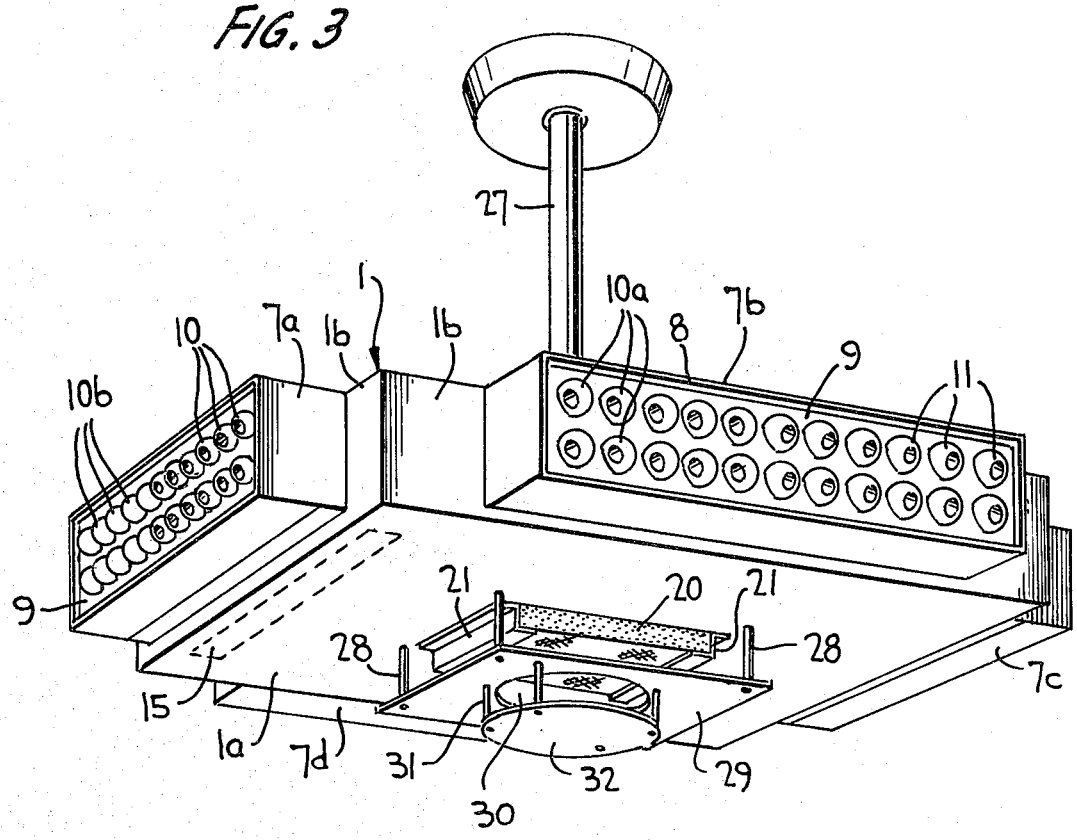
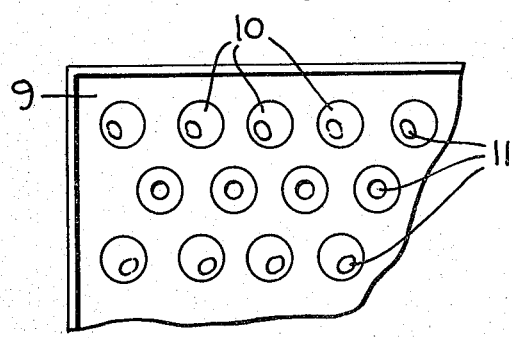

AIR IONIZER FOR ROOMS

BACKGROUND OF THE INVENTION

The invention concerns a room air ionizer consisting of a housing provided with an air outlet and inside of which are arranged spray electrodes connected to a high-voltage generator for the production of negative ions, and a fan to ingest preferably pre-filtered air into the housing and to blow it out over the brush-electrodes through the air outlet.

It is known that negative ions, particularly small ions which are absorbed on gas molecules contained in the air that is breathed by living creatures, have a generally favorable influence on the well-being of these creatures, e.g., the negative ions are known to stimulate their vital functions. For example, such negative ions have been found to activate and enhance the lives of human beings. On the other hand, positive ions, primarily large ions attached to solid impurities in the air, e.g., dust and smoke, have a disturbing and suppressing effect on living creatures, e.g., they induce quick fatigue, reduce vitality and render the organism more susceptible to infections.

Atmospheric electricity has a significant bearing also on biological phenomena in that organisms are best suited to a direct electrical voltage field directed from a positive atmosphere (space charge) towards the earth. Such conditions prevail in open air in fine weather. At a space charge (atmospheric charge) of $10^{-17}$ Asec./cm$^3$ at ground level, the magnitude of the voltage drop of this field close to the ground is approximately 130 V/m. Under the influence of this electric field, the positive ions in body will migrate in the direction of this field, i.e., from top to bottom, and the negative ions will migrate in the opposite direction i.e., from bottom to top. This migration of ions accounts for the fact that a strong atmospheric disturbance of the electric field, e.g., foehn and thunderstorm, cause functional disorders in organisms. For example, in humans such disturbances will cause, to a varying extent, sensitivity to weather, headaches, heart complaints, migraines, tiredness, listlessness, etc.

It has been known for a long time that in urban buildings of conventional construction which contain large quantities of reinforced concrete, an entirely unsatisfactory room climate prevails due to the general pollution of the air. More specifically, there is a considerable surplus therein of large positive ions, and due to the screening effect of the metal in the structure of the building, a considerably attenuated direct electric field is present on which, in certain circumstances, a strong alternating electric field may be superposed. For an equally long time, sustained efforts have been made to improve by artificial means such an undesirable room atmosphere and to convert it to the optimum climate which prevails in the nature in open air, e.g., in the clean air found in forests and during fine weather.

As a result of a long series of developments, modern room air ionizers have been developed which are operationally reliable and are capable of producing, in rooms, not only any desired ion density but also direct or uniform electric fields of any desired intensity and direction. In order to obtain the ion density required for a room in a dwelling by means of a room air ionizer, not only the technical parameters of the ionizer, e.g., the air throughput and the ion generation are important, but also the location of its mounting. Whilst the output of the selected ionizer has to match the volume of the respective room, the determination of the best place of mounting the ionizer is rather critical; if time-consuming experiments are to be avoided, this requires considerable practical experience. It therefore often happens that a satisfactory room climate is not achieved, only because the apparatus was located at an unfavourable location. With respect to the selection of the location of the ionizer, the governing factor is the so-called normal state of the room, such as the number, size and position of the windows and doors, the mode of heating, the type and location of furniture, work place, the number of persons usually present in the room, etc. But even if the site of mounting is chosen optimally, changes in this normal state of the room in question lead to changes in the distribution of the ion density in the room, which can only be balanced out to a certain degree by the adjustment of the operational, such as variation in the speed of the fan and variation in the high-voltage supply to the spray electrodes. Of the available compensating factors, not only the magnitude, but also the location of the disturbance may be decisive. Thus, e.g., a smoker entering the room may upset the distribution of the ion density which can no longer be compensated for by adjustment of the operational parameters when it happens at a certain point in the room (disturbance of air circulation).

The aim of the invention is therefore to provide an air ionizer for enclosed spaces (rooms), which not only affords greater freedom in the selection of its site but also enables one to take into account particularly disturbance-prone regions of the room.

The essential advantage of the invention is that once the site of the ionizer has been selected, its operation can be optimized solely by adjusting the spherical nozzles thereon and the ion supply for the respective regions of the room can be weighted. With the air ionizer according to the invention, it is not necessary to choose a new location for the ionizer when changes in the conditions in the room take place and, due to the effectiveness of the speed variation of the fan and variation in the high voltage fed to the spray electrodes, a satisfactory room climate can be maintained in a much simpler way than has been possible hitherto.

The invention will now be further understood by reference to the accompanying drawings, which show exemplary embodiments thereof, when taken with the following discussion.

DESCRIPTION OF THE DRAWINGS

FIG. 3 is a perspective view of another embodiment of room air ionizer according to the invention, in this case in the form of a ceiling-mounted light fixture which may have an air throughput of about 300–400 m$^3$/h; and FIG. 4 is a front elevation of a portion of a field of spherical or eyeball nozzles.

DETAILED DESCRIPTION OF THE PREFERRED EMBODIMENTS

Figure 1:
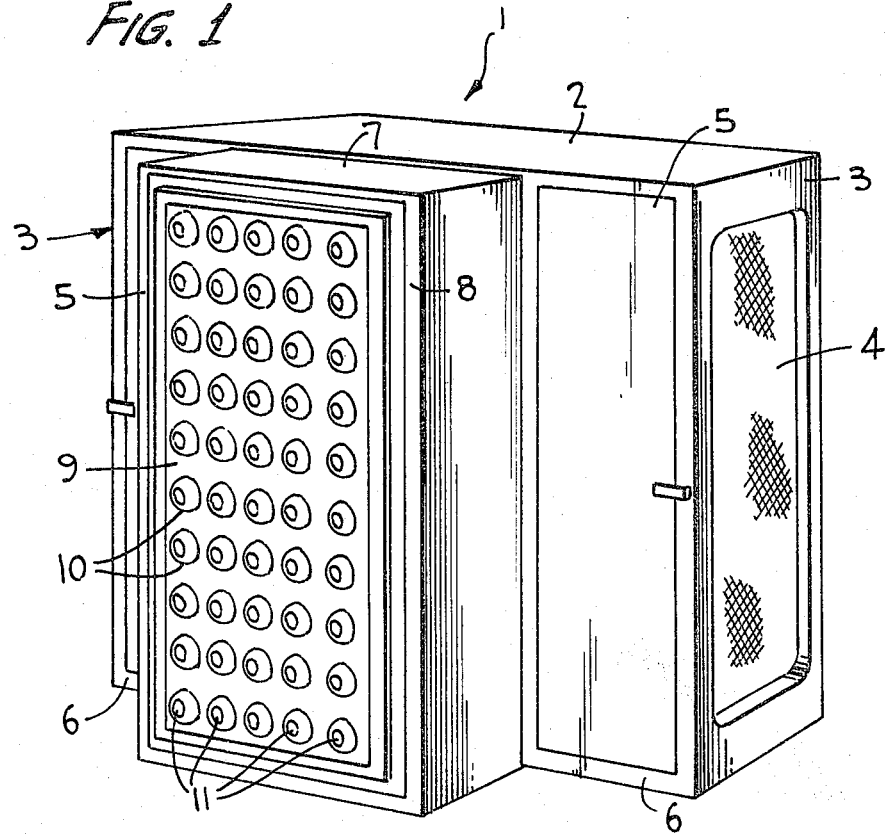
FIG. 1 shows a perspective view of a room air ionizer according to the invention, the air throughput of over 1000 m$^3$/h.

The room air ionizer shown in FIG. 1 is provided with a housing 1 which is divided into a filter part 2 and an ionizer part 7. The filter part 2 is shown to be in the form of an elongated box, the dimensions of which are, just to give an idea of its size, approximately 75 cm×47 cm×36 cm, and includes a barrel-shaped fan located in the central region of the box (not shown in FIG. 1) In the two shorter sides 3 of the filter part 2 of the housing 1 are air inlet apertures 4 which are covered by dust collectors, i.e., a set of filters is arranged in front of each air inlet aperture 4 in the filter part 2 of housing 1, this set consisting, as usual, of a coarse or pre-filter, an electrostatic filter and an activated charcoal filter for the absorption of odors. These filters are accessible via a lockable flap 5 which is fitted to the front side 6 of housing part 2. Adjacent the fan, the front 6 of the housing part 2 is open and to it is secured a similarly elongated box part 7 of the ionizer, with dimensions of, e.g., 31 cm×47 cm×25 cm. The air flow from the fan passes through the elongated box part 7 and out of the housing 1. This ionizer housing part 7 comprises, as usual, conventional spray electrodes which, as well as the rest of the constructional elements of the ionizer, such as the high voltage generator, the regulator and the switch, are all not shown in FIG. 1. The air outlet aperture of the ionizer housing part 7 is covered by a flat plate 9 comprising eyeball nozzles 10 arranged in rows and columns. Each eyeball nozzle 10 includes a through-going cylindrical nozzle bore 11. The eyeball nozzles 10 are adjustable in the mounting plate 9 as desired and are made of a synthetic material, as is the mounting plate 9.

Figure 2:
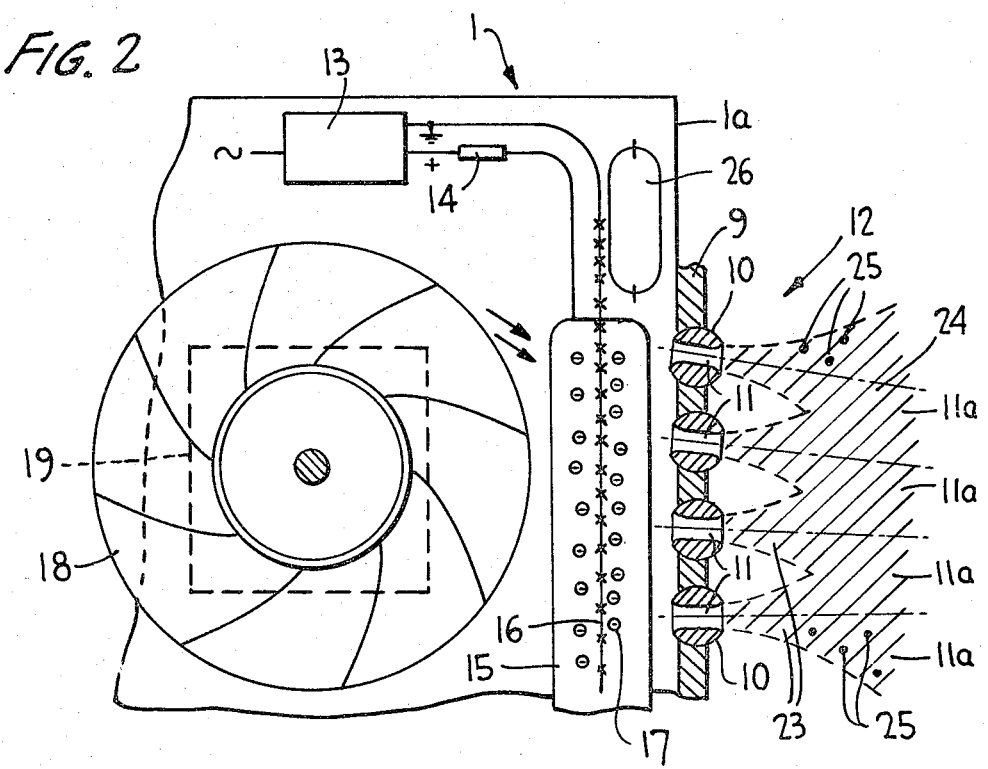
FIG. 2 is a diagrammatic representation of the principle of the design of the air ionizer according to the invention.

To explain the mode of operation of the room air ionizer according to the invention, reference should be made to FIG. 2, which shows schematically a fragmentary portion of the ionizer housing 1. A side wall 1a of the housing 1 supports the mounting plate 9 with the eyeball nozzles 10. The housing 1 contains a high voltage generator 13 connected to the main power supply, the eyeball nozzle arrangement generally designated by 12 and a plate-like counter-electrode 15 which is connected via a high-ohm resistor 14 to the positive terminal of the high voltage generator 13; above the electrode 15 is a wire-shaped spray (discharge) electrode 16 which is connected with the grounded negative terminal. The arrangement is such that when the high voltage generator 13 is switched on, a negative ion-field is maintained between the electrodes 15, 16. A fan 18 is also arranged in the housing 1, which ingests air via an air inlet aperture 19 covered by an air filter. The air delivered by the fan 18 (arrows 22) flows through the negative ion-field 17 between the spray electrode 16 and the counter-electrode 15, is charged with ions and then flows outwards through the bores 11 of the eyeball nozzles 10. Depending on the air pressure prevailing in the housing 1, i.e., on the speed of the fan 18, more or less concentrated jets 23 of air containing a surplus of negative ions 25 are discharged through the eyeball nozzles 10. The strength of these air jets depends on the speed (r.p.m.) of the fan 18 and their direction depends on the orientation of the axes 11a of the bores 11 of eyeball nozzles; the jets eventually unite into a single air stream 24, wherein the strength of the air stream essentially depends on the speed of the fan 18, the spatial velocity distribution depends on the alignment of the ball nozzles 10 and the ion-charge is determined by the magnitude of the high voltage applied to the electrodes 15, 16.

In order to eliminate the odors caused by oxidation and by stronger ionization and in order to destroy bacteria and virus, an ozonizer 26 with corona discharge is additionally arranged in the housing 1 for apparatus with, e.g., only one fibrous filter, the cold discharge of such ozonizer not having any toxic effects.

The particular advantages of the room air ionizer according to the invention particularly manifest themselves in a particular embodiment of the invention, which takes the form of a ceiling-suspended lighting fixture shown in perspective view in FIG. 3.

The room air ionizer shown in FIG. 3 has an essentially prismatic housing 1 of rectangular cross-section, and of a relatively small height so that it can easily be fastened to the ceiling at a connection point of the power supply by a conventional suspension piece 27 which is preferably adjustable in length. The air inlet aperture in the bottom wall 1a of housing 1 is covered by a fibrous mat 20 which acts as a coarse filter and captures the dust particles present in the ingested air and is supported, e.g., in carrier rails 21 so that it can easily be replaced. A deflector plate, e.g., a rectangular plate 29 with a circular aperture 30, is positioned in front of the fibrous mat 20 and is fixed to the bottom wall 1a of the housing 1 by means of spacers 28; the plate 29 and a disc 32 secured by spacers 31 in front of the aperture 30 provide for an adequate air supply. Similarly to that shown in FIG. 2, the housing 1 includes a high-tension generator connected to the power supply, preferably a cascade connected to a high-voltage transformer, spray (discharge) electrodes and counter-electrodes, which generate a negative ion field in front of each air outlet aperture in the four lateral walls 1b of the housing 1, a radial fan which sucks air in through the fibrous mat 20 into the housing 1, ozonizers and a (preferably remote control-operated) control apparatus for the control of the speed of the fan, the generation of ozone and the ionization of air. All these apparatures and devices being well-known, no further explanation of their function is deemed to be necessary.

A respective elongated auxiliary housing 7a, 7b, 7c, 7d closing the air outlet apertures is fastened to each of the lateral walls 1b of the housing which, like the embodiment illustrated in FIG. 1, has on its front face 8 a vertically arranged mounting plate 9 provided with the eyeball nozzles 10 arranged in two rows. The auxiliary housings 7a, 7b, 7c, 7d may also accommodate the ionization electrodes 15, 16 (FIG. 2), or these latter may be left out of it, in which case the mounting plates 9 bearing the eyeball nozzles 10 are inserted directly into the side wall 1b of housing 1.

The room air ionizer illustrated in FIG. 3 is preferably so arranged that its side walls 1b are aligned parallel with the walls of the room and in operation the air charged with ions is directed mainly towards the walls of the room so that the relatively rarely utilized corners of the room are not taken into consideration as regards ion supply, while the eyeball nozzles 10 in each mounting plate 9 are so aligned that the cylindrical nozzle bores 11 of the eyeball nozzles 10 are inclined downwardly or upwardly with respect to their axes lying in vertical planes. If the corner areas of the room need more attention, it is necessary only to adjust the lateral eyeball nozzles 10 in the mounting plate 9 accordingly, as is shown in FIG. 3 with the eyeball nozzles 10a. Generally, the nozzle bores 11 of the eyeball nozzles 10 are inclined downwardly so that the ions attain a suitable velocity component with the airflow, which is advantageous for the negative ions when as desired, a uniform electric field directed from the top downwardly is to be present in the room; due to the velocity component attained, small negative ions in particular move downwardly against the electric field forces acting on these ions and against the upwardly directed thermal (convection) air currents. In order to enable the adjustment or setting of the desired vertically-oriented fanning of the air currents discharged from the eyeball nozzles 10 of the mounting plate 9, at least two rows of ball-nozzles are provided in each mounting plate 9.

The rows of eyeball nozzles 10 may be arranged on top of one another (FIG. 3) or may be staggered, as shown in FIG. 4. If a little or no ionized air is required at a given side of a room, as may be the case when large pieces of furniture are set against a wall, a few or all of the eyeball nozzles 10 in the mounting plate 9 facing this wall may be shut off, as shown in FIG. 3 for the eyeball nozzles 10b of the auxiliary housing 7a.

The room air ionizer developed in the form of a ceiling-light fixture has the added advantage that the electric field required for the room may either be improved or in effect generated in the first place by very simple means. To achieve this end, within the housing 1 electrodes 15 with large surfaces (FIG. 3) are arranged on the bottom wall 1a of the housing, which wall is made of an electrically insulating synthetic material. The electrodes 15 are connected to the positive terminal of the high-voltage generator (FIG. 2) and act at the same time as counter-electrodes for the spray electrodes 16. The special design of such positive electrodes serving for the purpose of establishing the electric direct field, their arrangement in the housing 1 and their connection to the cascade can be adapted to the given circumstances and to the given construction of the ionizer.

There are various possibilities for arranging the eyeball nozzles 10 on the ionizer, e.g., in the case of an air ionizer developed in the form of a ceiling-light fixture (FIG. 3), the mounting plates 9 may, instead of being vertically arranged, be inclined downwardly or may have an adjustable alignment. The mounting plates 9 need not be planar: they may be arcuate or domed and, finally, a closed ring or torus of eyeball nozzles may also be provided. Due to the adjustability of the eyeball nozzles, such (or similar) variations of their arrangement have no great significance with regard to of the best adaptation of the air ionizer to the circumstances prevailing in given rooms.

I claim:

1. In an air ionizer useful for distributing negative ions in enclosed spaces in buildings, the air ionizer including a housing which has an air inlet opening and an air outlet opening, a fan located within the housing to suck environmental air into the housing through the air inlet opening and thereafter blow the air out of the housing through the air outlet opening, a number of negative ion-producing electrodes positioned in the housing for producing negative ions in the air therein, and a high-voltage generator electrically connected to the negative ion-producing electrodes, the improvement wherein a mounting plate which includes a multiplicity of individually adjustable ball nozzles is positioned over the air outlet opening, each of the ball nozzles being rotatable to determine in what direction the air with negative ions passing therethrough will flow.

2. The air ionizer as defined in claim 1 wherein the individual ball nozzles are separated from one another and are arranged in the mounting plate in at least two horizontal rows.

3. The air ionizer as defined in claim 1 wherein the mounting plate and each ball nozzle contained therein is made of electrically-insulating synthetic material.

4. The air ionizer as defined in claim 1 wherein the negative ion-producing electrodes are positioned in the housing between the fan and the air outlet opening.

5. The air ionizer as defined in claim 1 wherein the housing includes a box-shaped filter part and an interconnected box-shaped ionizer part, the air inlet opening being located in a side of the box-shaped filter part and the air outlet opening being located in an exposed side of the box-shaped ionizer part, wherein at least one filter screen is located over the air inlet opening, and wherein the negative ion-producing electrodes are positioned in the box-shaped ionizer part adjacent the air outlet opening.

6. The air ionizer as defined in claim 1 wherein the housing includes a box-shaped filter part having top, bottom and four side walls, a box-shaped ionizer part respectively connected to the four side walls of the box-shaped filter part, and a suspension means connected to the top wall of the box-shaped filter part to attach the housing to a ceiling, the air inlet opening being located in the bottom wall of the box-shaped filter part and a separate air outlet opening being located in an exposed side of each box-shaped ionizer part, wherein a separate mounting plate with individually adjustable ball nozzles are positioned over each air outlet opening, and wherein a filter screen is located over the air inlet opening.

7. The air ionizer as defined in claim 6 wherein separate negative ion-producing electrodes are located in each of the four box-shaped ionizer parts.

* * * * *